June 20, 1967  P. BARAN ET AL  3,326,008
ELECTRICAL GOPHER
Filed April 1, 1965  7 Sheets-Sheet 1
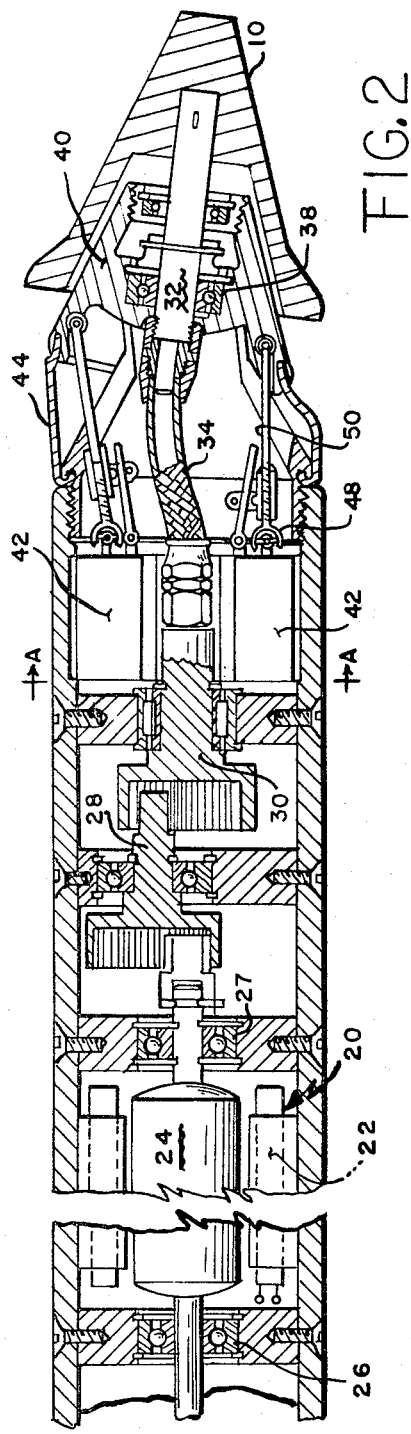
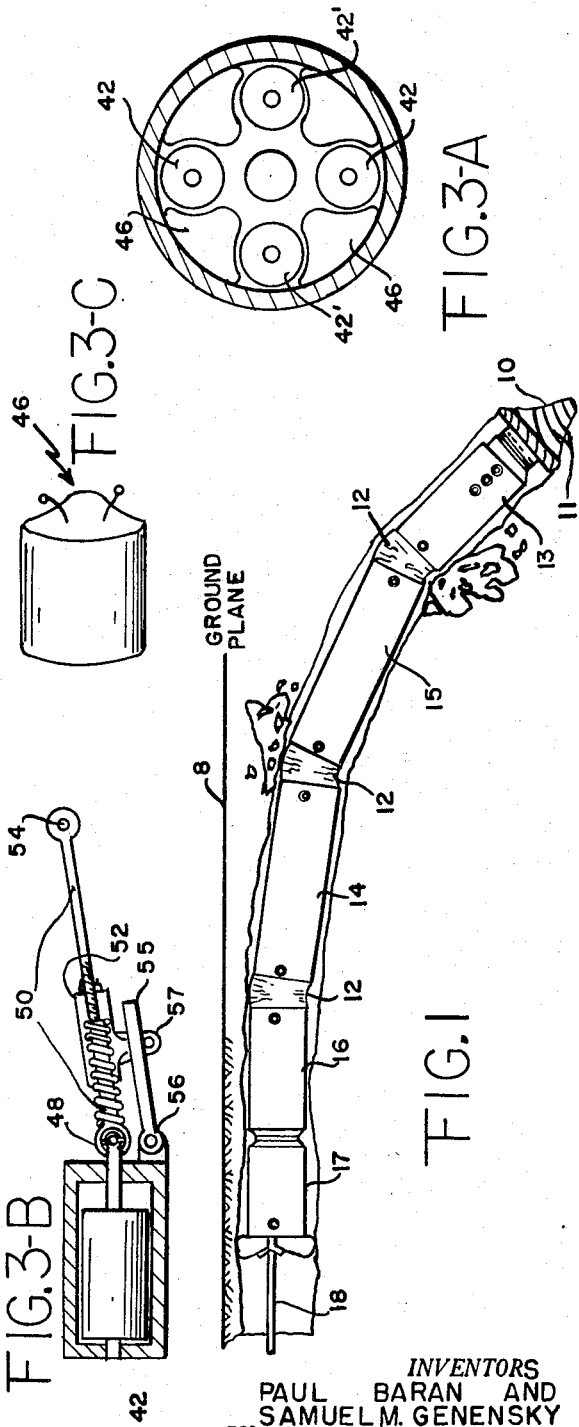
INVENTORS
PAUL BARAN AND
SAMUEL M. GENENSKY
BY Harry A. Herbert Jr.
ATTORNEYS

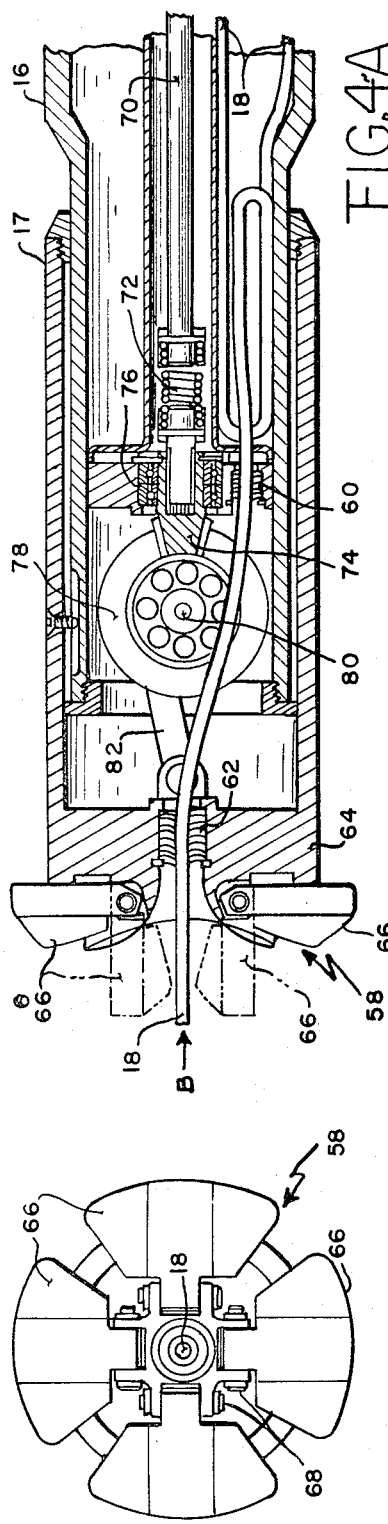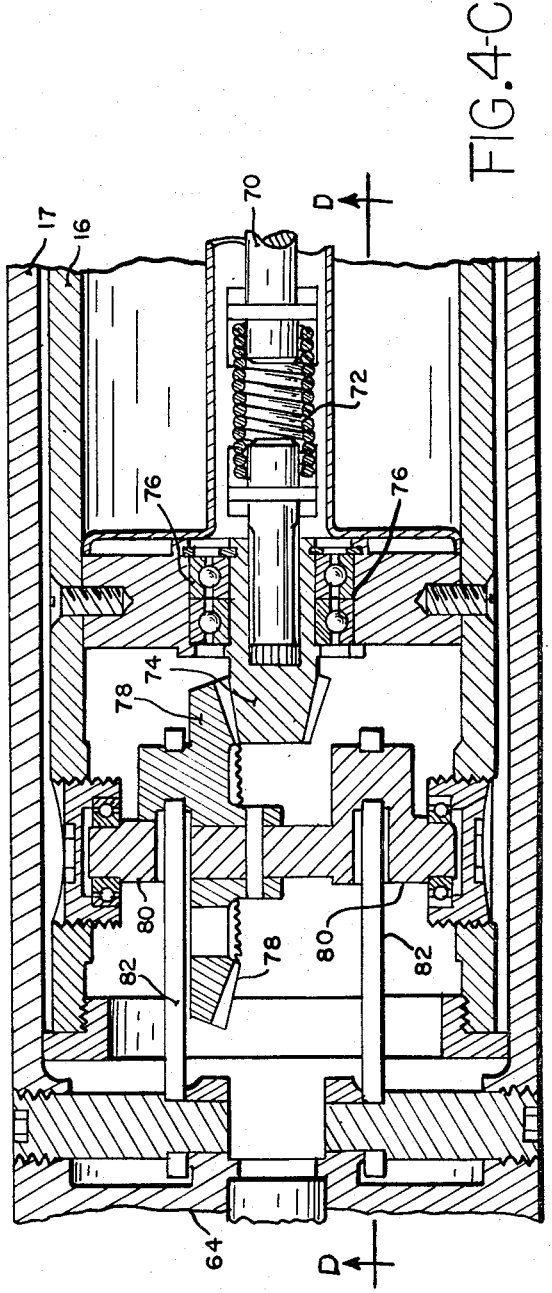

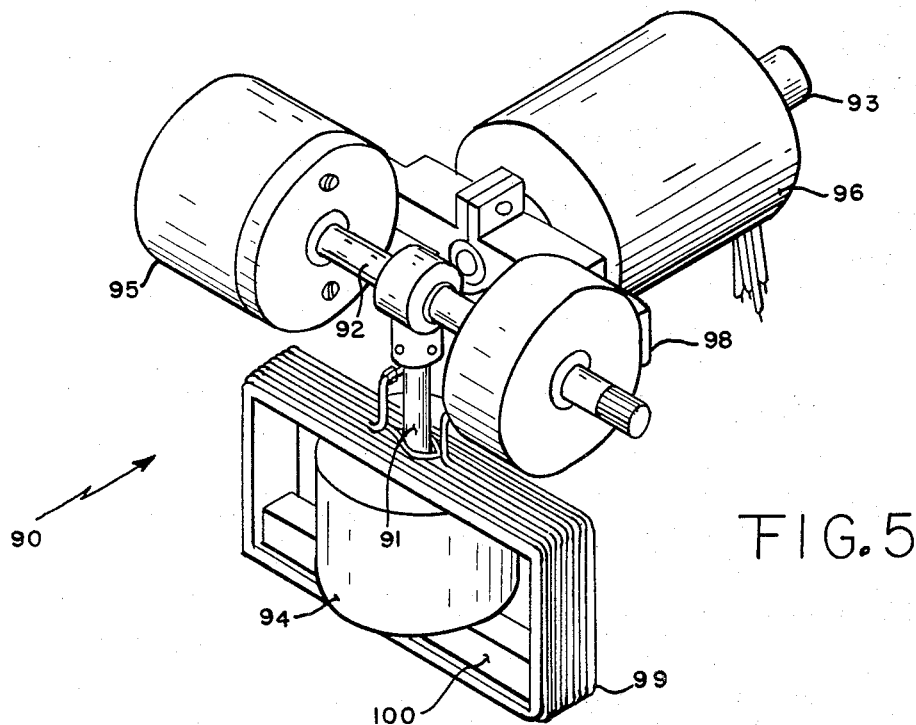
FIG. 5
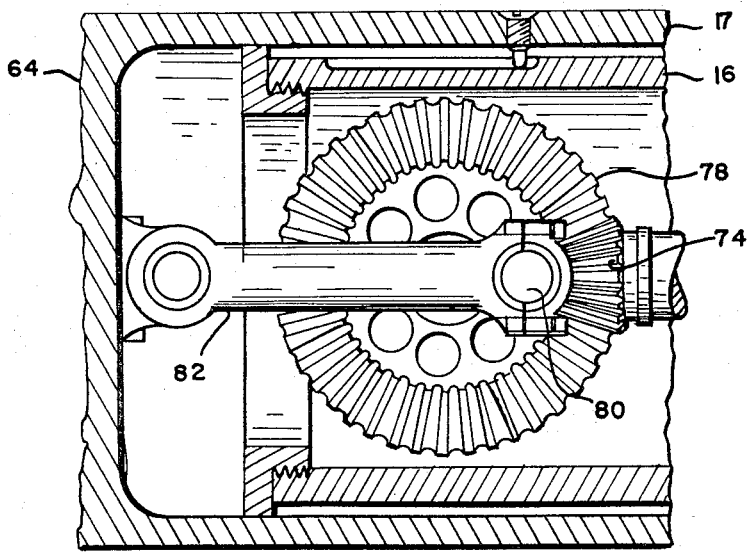
FIG. 4-D

June 20, 1967  P. BARAN ET AL  3,326,008
ELECTRICAL GOPHER
Filed April 1, 1965  7 Sheets-Sheet 5
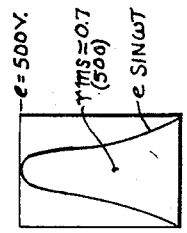
FIG. 7
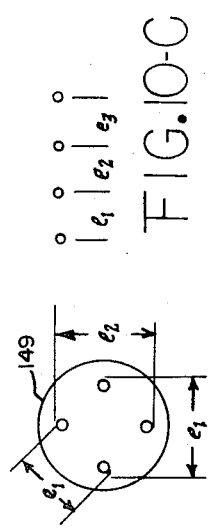
FIG. 10-A  FIG. 10-B  FIG. 10-C
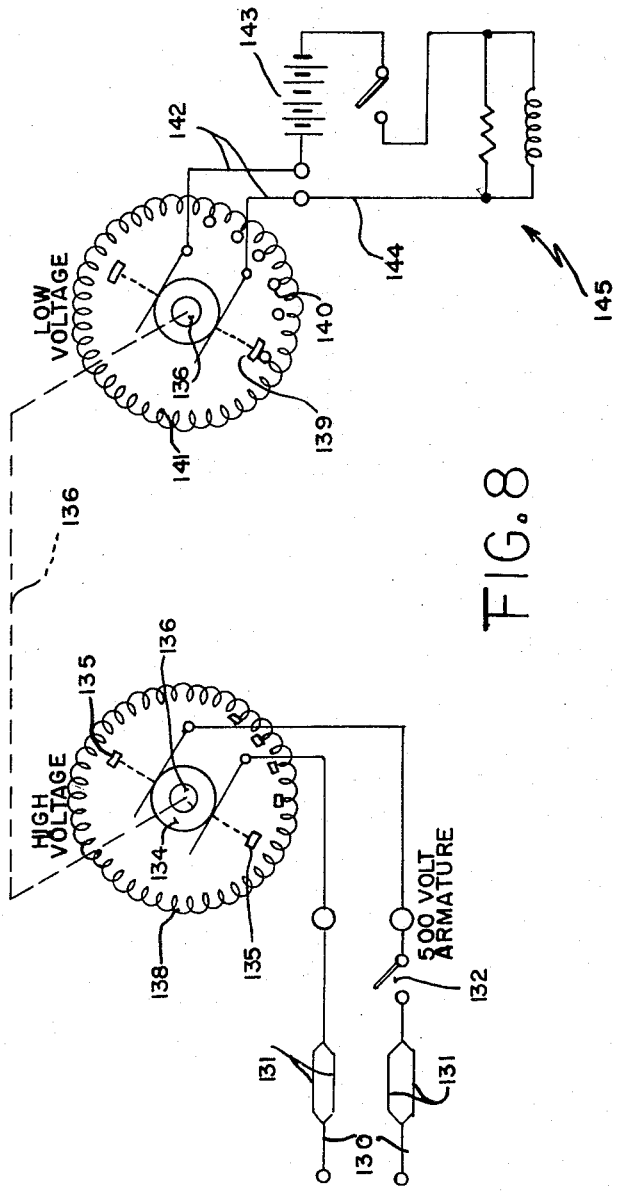
FIG. 8
INVENTORS.
PAUL BARAN AND
SAMUEL M. GENENSKY
BY Harry A. Herbert Jr
Anita G. Cadieu
ATTORNEYS

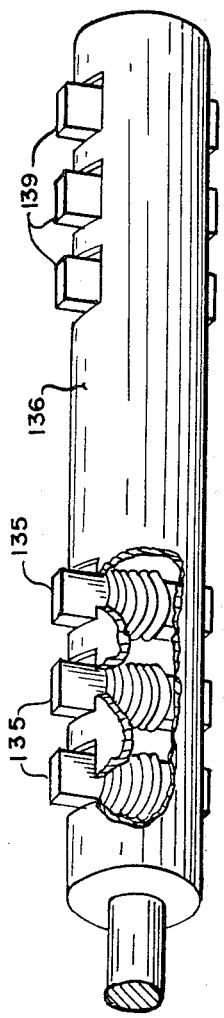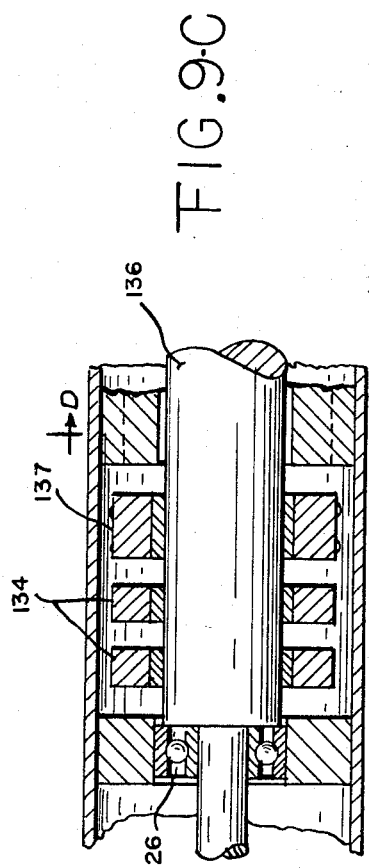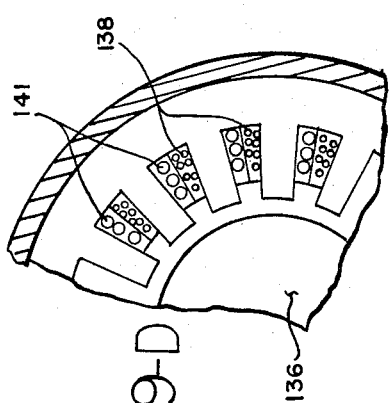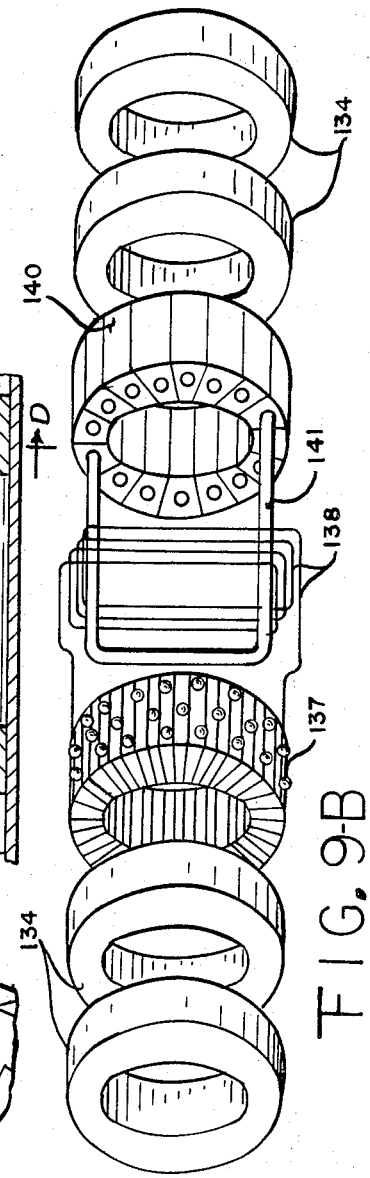

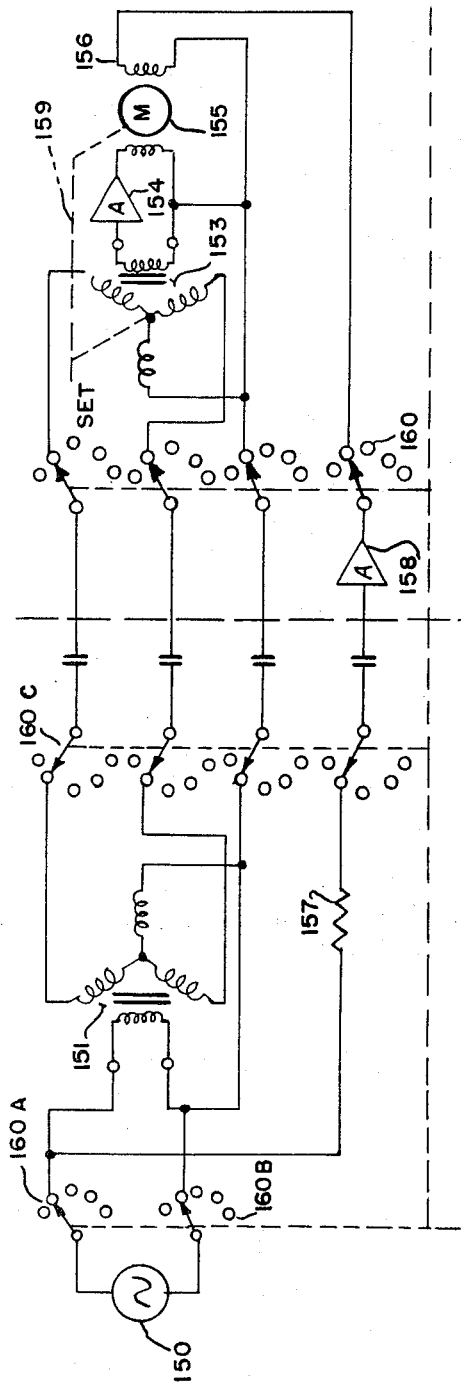

3,326,008
ELECTRICAL GOPHER
Paul Baran and Samuel M. Genensky, Los Angeles, Calif., assignors to the United States of America as represented by the Secretary of the Air Force
Filed Apr. 1, 1965, Ser. No. 444,879
17 Claims. (Cl. 61—72.5)

ABSTRACT OF THE DISCLOSURE

A device for drilling long holes for the laying of underground cable which comprises extruding the cable from the rear one of a train-like series of casing units connected by universal joints, and headed by a drilling instrument, moving the disturbed earth to fill the hole and compacting the earth around the cable. The casings contain operating and controlling devices including a position sensor providing information to an above-ground control station. When the drill encounters hard obstacles, such as rocks, it changes direction drilling around the obstruction. When its power source is cut off, it surfaces, supplied by a self-contained and self-starting reserve power source.

This invention relates to improvements in subterranean drilling and boring techniques, and more specifically to devising a drilling mechanism for cable laying which exhibits intelligent behavior.

Specifically, this invention describes a method of and apparatus for producing long holes through the ground for conveying electrical cable communications circuits at low cost. At present, adequate techniques exist for plowing in communications lines in shallow depths of earth. Means also exist for economically trenching and back filling trenches on the order of 6 to 10 feet in depth. However, when it is necessary to provide holes through the earth for communication lines at much greater depths, only very expensive tunneling methods are currently available. Such methods are so expensive as to preclude the use of buried communications lines in many cases where they would otherwise be advantageous. For example, military communications circuits could be made to be more immune from the deleterious effects of weapons, including thermonuclear devices, if such lines could be implanted at greater depths than now commonly used.

It is an object of this invention to provide a device able to dig and imbed a cable along a circuitous path at or below the surface of the ground so as to avoid drilling through hard geological materials.

It is another object of this invention to permit the laying of communication cables by simultaneously drilling and spinning off a cable carried on a spool affixed to said drill and back filling the hole so drilled.

It is a further object of this invention to provide means for recovery of a drilling mechanism in case of loss of control circuits and/or power cable. More specifically, the invention provides means located within the assembly or train for reversing the operation of the generator in case of power failures, providing emergency power from within the device for retrieving the drill and means are provided for directing the drill upward so that it surfaces.

It is another object of this invention to provide means for spatially orienting a drilling mechanism.

It is a further object of this invention to provide a compaction mechanism associated with a drilling mechanism which would eliminate the need for removing drillings by flushing or other conventional methods. The operation of compaction and the mechanism for its accomplishment has the further function of augmenting the forward drive of the drill head and of providing additional forward impetus.

Numerous boring and drilling techniques are available for drilling and boring holes through the earth. These techniques all create openings whose cross-sectional area is much greater than the cross-sectional area of communications cable. Present day communication cables are often of very small diameter. For example, a specially designed submarine cable one-sixteenth of an inch in diameter exists which is able to withstand thousands of pounds of pressure and yet transmit megacycles of electrical signal bandwidth provided that suitably spaced repeater amplifiers are built into the cable. Currently, if such a cable were to be laid horizontally, several hundred feet below the ground surface and for distances greater than a few hundred feet, a huge tunnel—often six or more feet in diameter—would have to be excavated. Thus, using present techniques, it is necessary to drill or bore a hole whose cross-sectional area is millions of times greater than the cable to be laid. The primary objection to tunneling is the high cost of such an operation. Tunnels cost on the order of hundreds of dollars per linear foot.

The proposed invention seeks to markedly reduce the cost of drilling communications holes.

While to date the drills created by man cannot drill long circuitous holes, other animals further down the philogenetic scale such as: the worm, the mole, and the gopher, fare better. The fundamental difference is that the biological digging machines have more "intelligence" at the drill head than man's drills. A gopher, for example, doesn't attempt to chew through rock like man's drill. Thus, an object of this invention is to allow a drilling mechanism to exhibit "intelligent" behavior.

It is a further object of the invention to provide a compact and complete assembly all housed in the moving, operational device or train for, first, orienting the drill head, second, providing electrical power, third, reduction of mechanical power, fourth, providing a compacting device to the rear of the train for compacting the earth where it was disturbed and leaving it as nearly as possible like it was before, and fifth, providing a source of power within the train for surfacing the drill head in the event of above ground power failure.

Further objects of this invention will be evident from a study of the description which follows and the drawings appended hereto, wherein:

FIG. 1 is a diagrammatic view of the electrical drilling device in operation underground;

FIG. 2 is a longitudinal sectional view of a simple motor, a drill, and gear reduction mechanism;

FIG. 3A is a cross-sectional view taken substantially on the line A—A of FIG. 2;

FIG. 3B is a detail of a coupling actuator and the link system for directional control of the drill.

FIG. 3C is an isometric view showing the configuration of the control package.

FIG. 4A is a diagrammatic longitudinal-sectional view of the compaction device;

FIG. 4B is an elevational end view of the compaction device viewed from the direction indicated by the arrow B in FIG. 4A;

FIG. 4C is a fragmentary diagrammatic view in longitudinal-section of a portion of the compaction mechanism;

FIG. 4D is a horizontal fragmentary-sectional view of the compaction device taken substantially on the line D—D of FIG. 4C;

FIG. 5 is a perspective view of the three axis positional sensor;

FIG. 7 is an illustration of the power signal wave form;

FIG. 8 is a wiring diagram of the emergency circuit which is activated for the retrieval of the device in the event of above ground power source failure;

Figure 6:
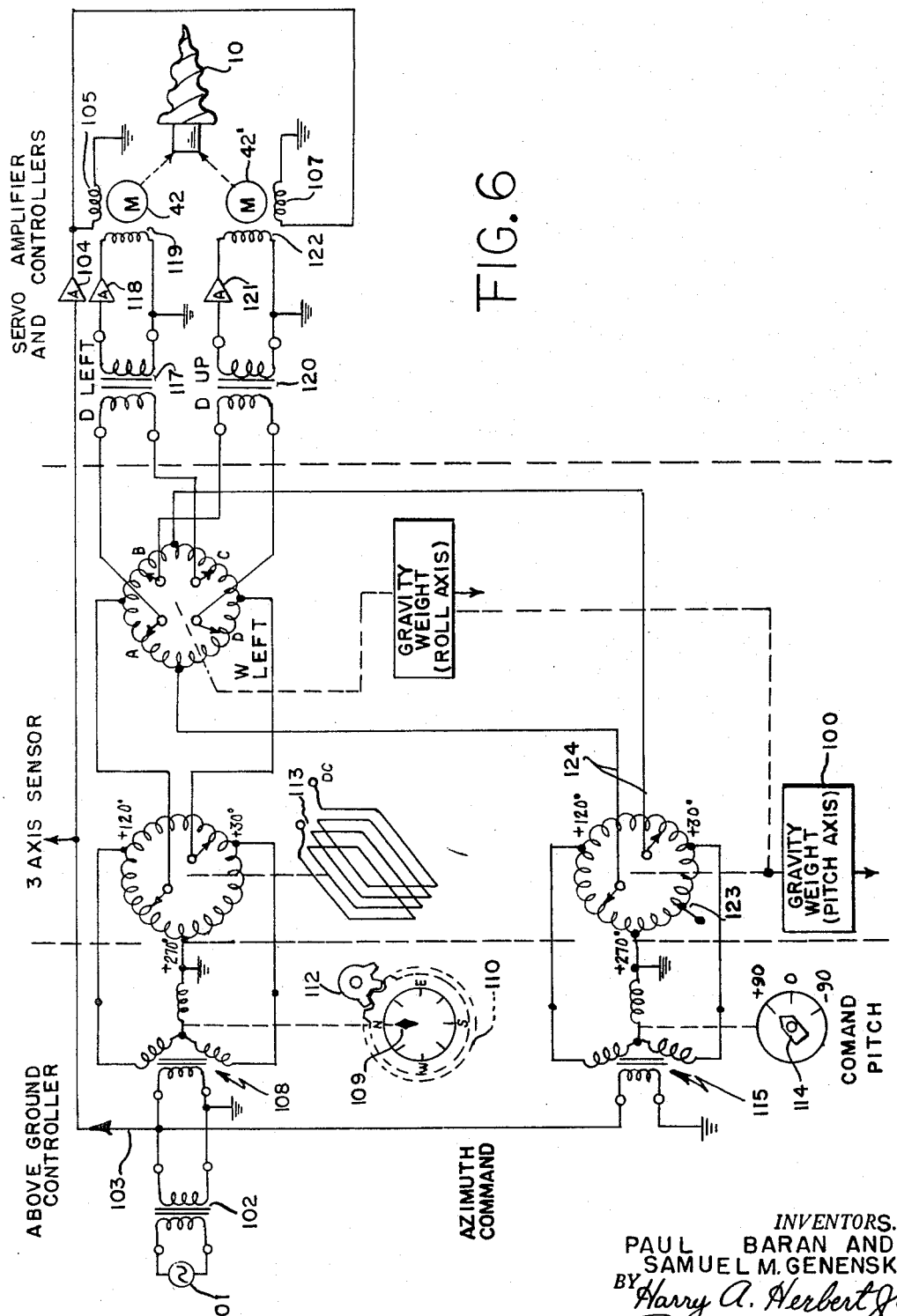
FIG. 6 is a simplified schematic diagram of the electrical control circuits which permits above ground control of the subterranean drilling direction whereby commands are transmitted from above ground to the drill head.

FIG. 9A, taken together with 9B, is a schematic view in perspective and exploded of the parts of the modified motor of FIG. 3, wherein the motor operates also as a generator for providing a continuous source of power available in emergencies for retrieval of the device in case of power failure;

FIG. 9C is a longitudinal fragmentary section of the modified motor/generator;

FIG. 9D is a cross-section taken substantially on the line D—D of FIG. 9C;

FIGS. 10A, 10B and 10C are schematic representations illustrating the necessity of three separate signals for any single positional command to the drill head;

FIG. 11 lists the possible combinations of positive, negative and zero voltages, whereby 27 independent signal states may be transmitted on the four wires of FIG. 10B; and FIG. 12 is a schematic drawing of the control circuitry used to transmit the command signals.

Referring more in detail to FIG. 1 of the drawing, this figure is a schematic representation of the complete device showing segments arranged in train like fashion, and literally worming its way through the earth 8.

The drill bit or drill head 10 is of expedient construction. The special bit designed for this operation is provided with angular grooves forming teeth 11.

Six components are shown, each comprising a casing which houses one or more of the operating components of the system. It is to be understood that the invention does not depend upon or reside in the specific order in which these components are shown or described. The important concept is a series of casings, each casing connected to its adjacent casing by a universal joint 12 allowing universal angular adjustment between adjacent casing elements. This joint is of any adaptable standard construction and allows the drill head to change its direction while the ensuing train of components turns in the small diameter tunnel thus produced and follows the angling drill head. Segments 16 and 17 have sliding and telescoping relationship for a purpose later described. Each of the several casings, 13, 14, 15, 16 and 17 houses one or more components of the device which will be described later in more detail.

Behind the drill bit 10, and located within the housing 13, there is a mechanism for controlling the angular setting of the drill 10; a motor 20 providing power for the drill 10; and a gear reducing mechanism for reducing the speed of the mechanical power generated. A rear section 17 houses the earth compaction mechanism and a section 16 stores power cable 18. The power cable 18 is shown in FIGS. 1 and 4 being extruded to the rear of the gopher and the earth is being compacted about it. Positioned in the section 15 immediately to the rear of the housing 13 is a three-axis positional sensor which provides orientational information to the above ground control.

As the term gopher is here used, it will be understood to comprise the whole working unit or assembly operating below the surface of the earth and includes all of the above noted components. It may sometimes be referred to as a train.

It is to be understood that the invention is basic in character, and that in some instances specific showings of means are exemplary only.

Referring to FIG. 2, a motor casing 13 houses a motor 20, having field coils 22 and a rotating armature 24. The armature, 24, mounted in bearings 26–27 is operatively connected to reducing gears 28 and 30 to increase the torque available at the end of the drive or output drill shaft 32. This power is applied to an Oldham coupling 34 or other suitable flexible and non-concentric shaft coupling device. Power is thus transmitted to the drill shaft 32. As will be seen, the drill shaft 32 is mounted in a thrust bearing 38 and is operatively connected to the drill head 10. The function of thrust bearing 38 is to absorb excessive thrust load of the drill head so that it is not transmitted to the flexible power coupling. The drill shaft 32 and thrust bearing 38 are concentrically mounted within a moveable and directable structure 40.

The angular position of the structure 40 is controlled by four electrical actuators or motors 42 and 42', themselves controlled at an above ground control center. (See FIGS. 2 and 3A.) A flexible covering boot 44, made of suitable heat-resistant, tough material, protects the power transmission and serves to keep it clear and free of the drilled earth material.

The device for controlling the angular position of the drill head is shown in FIGS. 2, 3A, 3B and 3C. In the example shown, there are four actuators. The vertical pair 42—42 control the vertical angle of the drilling head, while the horizontal pair 42'—42' control its horizontal direction. These actuators are controlled by electronic control packages 46, controlled from above ground as hereinafter described. The control packages are located between the control motors, 42—42 and 42', 42' (FIGS. 3A and 3C). Each control package is embedded in a plastic protective matrix which allows it to function even when subjected to the intense vibration and close proximity of the drill head.

The directional actuators govern the drill head direction as follows: an electrical coil, controllable at an above ground location, runs the linear motors 42, 42 42', 42'. Each motor is operatively connected through a lever system and universal connection 48, to one of the four control rods 50.

Each control rod 50 is a divided element, the adjacent ends screw threaded in right and left fashion into a frame 52. The inner segment of the rod 50 receives the rotary motion imparted from the motor 42, moving the frame 52 to increase or decrease the effective length of the rod 50. The outer end of each rod 50 has pivotal connection at 54 to the directable structure 40, thus orienting the structure 40, and with it the direction of the drill head.

In addition to its capability of increasing or decreasing in effective length the frame 52, together with the rod 50, also has pivotal motion by virtue of the universal joint 48 at its inner end. A supporting rod 55 pivots at 56 and has sliding engagement in the frame 52. The vertically positioned pair of rods 50 have pivotal motion in a vertical plane; the horizontally positioned pair pivot in a horizontal plane.

The impulse actuating each motor to provide direction to the drill head through control rods 50 is supplied by a control center located above ground in a control location, orientational information being supplied to the control center by a sensor, shown in FIG. 5, and hereinafter described.

The final segment 17 of the assembly train operating underground houses the means for storing and extruding the power cable 18 and the compacting mechanism 58 for compacting the earth about the extruded cable as the gopher moves forward.

One of the functions of the casing 16, shown in FIGS. 4A to D inclusive, is to store the power cable 18 on spools or stored in any expedient manner. The cable extends from the drill tool actuator through each of the moving segments; is stored on spools in the segment 16; is extruded therefrom, and extends to the above ground control center. The cable 18 is made up of the large quantity of small conducting elements necessary to equip the system. By pre-twisting the wire, it can be pulled through a small opening without any tendency to kink. Two such openings, 60 and 62 are provided. (See FIG. 4A.)

The casing 16, which houses the stored cable, telescopes within the rearward casing element 17. A unidirectional bushing 60 allows one-way passage of the cable 18, and a second unidirectional bushing 62, located centrally of the rear wall 64 of the casing 17, allows final extrusion of the cable centrally, and out through the compaction mechanism. Reciprocating movement of the telescoping casing on sleeve 16 within the casing 17 forms the basis for the earth compacting operation.

Four compaction leaves 66 are shown, each pivoted at an individual pivot point 68 to the exterior of the wall 64 to pivot freely.

As the drill progresses, moving the whole train forward, the earth from the drill slides rearwardly, tending to pivot the leaves 66 to the position shown in phantom in FIG. 4A in a compacting movement, tamping the earth closely around the extruded cable.

As the gopher moves forward, the leaves 66 close around the cable 18. In addition, the reciprocating movement imparted to the sleeve 17 causes the leaves 66 to encounter alternately an earth barrier to the rear which flattens them against the rear wall 64 and the earth barrier of the drillings which have traveled exteriorly along the train casings, which causes the leaves to fold inwardly, compacting earth around the cable. Thus, the electrical gopher drills his own hole, pushes its drillings back toward the rear and toward the compaction mechanism. It then forces the drillings back into the hole it has left in its "wake" and finally the leaves 30 recompact the soil substantially to its original volume.

The device for producing the reciprocating motion of the sleeve or casing 17 is comprised as follows:

A power shaft 70 is provided with a cushioning device 72, and provides power to a small bevel gear 74. Electromagnetic coupler 76 operatively connects and disconnects the power shaft 70 and the gear 74. The gear 78 is rigidly mounted on a cam shaft 80 forming a diameter of the casing 16 and journaled at its diametrically opposed ends in the casing 16.

A pair of links 82 are pivotally and eccentrically secured—one to the gear 78, and the other to the cam shaft 80. The remaining end of each link is pivotally secured to the rear wall 64 of the member 17. The rotation of the gear 78, powered through the shaft 70, thus produces reciprocating motion to the sleeve 17 and the earth is compacted as above described.

The compaction serves two separate functions, in addition to firming the earth about the newly laid cable: (1) it removes the drillings normally requiring flushing or other forms of removal, and (2) it provides additional thrust to the drill head.

FIG. 5 is a perspective view of a three-axis positional sensor indicated generally by the numeral 90. This sensor is located adjacent the drill head, preferably in section 13 and travels underground with the gopher. It has electrical connection with the drill and provides information to the control system which is located above ground and is shown in FIG. 6. Its function can be served by any device capable of providing (1) a vertical reference angle relative to the main axis of the gopher and (2) a measurement of the magnetic field of the earth perpendicular to that axis.

The three axes of the sensor 90 are the three shafts: 91, 92 and 93, arranged in three planes, each normal with respect to the other two and each having one and only one journal bearing on one of the other two.

Each shaft has mounted upon it a multi-tap angular position potentiometer pick-off, each providing orientation information to the control center, which is located above ground. They are: yaw potentiometer 94, journaled on the shaft 91, the pitch potentiometer 95 rigidly secured on the shaft 92 and the roll potentiometer 96 rigidly secured to its shaft 93. The potentiometer 96 is the fixed point of the sensor system. That is to say, it is secured into the train casing by means of bracket 97 and, for present practical considerations, is rigidly oriented with respect to the drill head 10 through lead 97.

The journal connections of the shafts with respect to each other are: the journal element 98 suspends the shaft 91 on the shaft 92; the frame 98 on which the roll potentiometer 96 is rigidly mounted and on which is suspended the potentiometer shaft 92 and potentiometer 95; the frame 98 also functions as a counterbalance for the pitch potentiometer 95.

A field coil 99 operating as a compass is rigidly secured to the shaft 91 and rotates with it. The weights 100 provide inertia.

When the coil 99 is energized by a D.C. current, the magnetic field induced causes the coil 99 to move to orient itself to parallelism with the earth's magnetic field. The weights 100 provide inertia for the element 94 and the shaft 91 moves with respect to it.

To avoid deleterious effects of strong nearby magnetic fields when the motor is rotating, two precautions must be observed: (1) no current is applied to the magnetic field coil 99 which serves also as a compass, and (2) all components in the vicinity of the three-axis sensor of FIG. 5 are made of non-magnetic materials.

Since the device is connected to a casing which is part of the electrical gopher, the amount of rotation of the shaft 91 is a measure of the angular direction of the course of the gopher relative to the earth's magnetic field in the plane of the earth's surface.

Two separate coordinate systems are used (see FIG. 6). The first "world" (W) coordinates are Cartesian coordinates relative to the earth. The second "drill" D coordinates are measured relative to the directional control motors 42 and 42' of the drill head 10. The notation W–LEFT/W–RIGHT on FIG. 6 indicates that the yaw potentiometer 94 produces information indicating whether the gopher is to turn left or right in terms of world coordinates.

The outer casing of the roll potentiometer 96 is rigidly connected to a casing member of the gopher, and has a journal bearing connection with the frame 98.

The roll potentiometer 96 measures the roll angle of the gopher relative to the vertical. This device of the roll potentiometer is used to convert control signals from world coordinates into drill coordinates, as will now be shown in connection with a study of FIG. 6.

In FIG. 6 there is shown a simplified schematic view of the electrical control circuits which permit above ground control of the gopher's subterranean drilling direction. The diagram of FIG. 6 is divided into three sections: the above ground control at the left; the connections and functions of the three-axis sensor 90 at the center; and at the right, the servo amplifiers and control motors 42 and 42' which control the direction of the drill head 10.

A source of alternating current acting as reference signal 101 is applied to an isolation transformer 102 across whose output is connected a phase reference line 103. This line connects to an amplifier 104 within the gopher. The output of the phase reference line 103, after being amplified, is applied to the field coils 105 of the pair of motors 42, which provide horizontal directional control of the drill 10. (Only one motor 42 is shown in the diagram of FIG. 6.)

The same amplified phase reference signal 103 is applied through amplifier 104 to the pair of field coils 106 of the control motors 42' for controlling vertical direction of the drill 10.

Also energized from the phase reference line 103 is an azimuth control synchro 108. The shaft 91 of this synchro (see FIG. 5) is attached to a control knob and pointer 109 (FIG. 6) which is attached to the shaft of the synchro 106. The control knob 109 is rotatably mounted on an azimuth position bezel 110, which is provided with azimuth indications of North, East, South and West. A gear 112 allows rotation of the bezel 110 for magnetic variation correction. The knob 109 is set in the desired direction of drilling relative to the world azimuth coordinates. The signals from the azimuth control synchro 108 are transmitted to the motors 42 and 42′ to orient the drill. These control signals energize a potentiometer 94 (see FIG. 5) so as to perform an electrical operation identical to that of the synchro control transformer 108. For the present purpose a potentiometer is preferred to a synchro because it minimizes magnetic fields near the compass coil 94. The synchro control transformer equivalent potentiometer 94 is connected by means of the shaft 91 to the electromagnetic coil or compass 99.

When the drive motor is deactivated and the control circuits energized, direct current is applied at the terminals 113 of the compass coil 99. This causes the potentiometer shaft 91 to rotate in the azimuthal plane to orient itself with the earth's magnetic field.

The output of the potentiometer 91 is a measure of the difference in angles between that directed by the control knob 109 and the compass coil 99.

The difference, or error output of the yaw potentiometer 94, is shown diagrammatically at 98 and is an indication in world coordinates whether the error is to the left or to the right.

A similar above ground pitch control synchro 115 is used to initiate pitch angle commands. A control knob 114 is connected to the shaft 92 of the pitch control potentiometer 95. The output of the pitch synchro 115 is connected to the pitch potentiometer 95. The shaft 92 of the pitch potentiometer 95 is connected to the gravity weight 100.

The output lines 104 produce a voltage signal proportional to the difference between the commands given at 115 and the pitch of the drill in world coordinates.

One pair of outputs A′ and C′ from the roll potentiometer 96 is connected to an isolation transformer 117. The output of this isolation transformer is amplified by amplifier 118 and applied to the control phase coil 119 of the two phase horizontal axis control motor 42. Similarly, the output signal from the second pair of brushes B′ and D′ on the potentiometer 96 is applied to the other isolating transformer 120, thence to an amplifier 121, finally to the control phase coil 122 of the two phase vertical axis motor 42.

The drill 10 is generally drilling a horizontal hole in a given azimuthal direction. Necessary changes in azimuthal direction are made by rotating knob 109. Similarly, the pitch control knob 115 is rotated to change altitude.

In case of power line failure, control circuits are energized by an emergency battery 143, FIG. 8, contained within the train and kept continually charged by the motor/generator. The device is thus enabled to continue operation for a limited time and rises vertically without need of external command. In the event of a broken power feed line, the internal source of A.C. voltage produced by the battery 143 is applied to a tap 123 on the pitch potentiometer 95 and on the open phase reference line (see FIG. 6). This will cause the operation of the control levers to direct the drill head upwardly without changing its horizontal heading.

FIG. 7 is an illustration of the waveform of a D.C. compared to that of a sinusoidal A.C. signal. Since the power handling capability of an electrical wire is limited by both the instantaneous peak voltage and root mean squared current, it can be seen by inspection of FIG. 7 that approximately 30 percent more power can be delivered to the gopher on a given cable using direct rather than alternating current. In order to feed maximum power over a small diameter cable, it is advantageous to design the gopher to operate from voltages on the order of 500 to 1000 volts. However, minimum volume maximum energy batteries are low voltage devices.

FIG. 8 is a schematic view of an electrical circuit of a motor designed specifically for this application, together with the emergency battery and power feed arrangements of the gopher.

Power is applied in the range of 500 to 1000 volts to the above ground terminals 130. The four wire feeder cable 131 converts the above ground feed point to the motor 20 (see FIG. 3) within the gopher train. The four separate lines are used to simplify transmission of electrical control signals. The four lines are shown at 131 in FIG. 8. They are connected for power transmission into two pairs, each composed of two lines. The power is fed through a protector relay 133 to a pair of slip rings 134, (FIGS. 8 and 9A) connected to electrical brushes 135 rotating with the magnetic shaft 136 across commutator segments 137. The commutator segments 137 are connected to the high voltage motor armature windings 138.

Up to this point, the operation is identical to a conventional high voltage direct current motor. However, in the modification of the device shown in FIGS. 9A, B, C and D, a second set of brushes 139 are mounted to rotate with the shaft 136 and engage a second commutator 140, which is connected to an independent low voltage winding 141. The low voltage winding 141 is wound adjacent to the high voltage winding 138, and operates as a low voltage generator driven by the high voltage motor, shown in FIGS. 9A, 9B, 9C and 9D. The output 142 of this low voltage generator charges the emergency battery 143. A thermostatic and over-current protector 145 automatically disengages the battery 144 to prevent overcharging.

In the event of a power failure, the low voltage "generator" functions as a motor, powered by the emergency battery which, as described above, is kept constantly charged.

It will now be apparent that the motor operates to drive the transistorized control circuits, while it functions also for transforming high voltage direct current to low voltage direct current and thereby keeps a battery charged; and is itself capable of operating from the low voltage batteries in emergencies.

FIGS. 9A, 9B and 9C show the motor/generator in more detail. Because of the high voltages and diameter limitation, the motor is built "inside out." That is, the normally rotating coils 138 and 141 are fixed while the field magnet and brushes rotate. The commutator 140 and slip rings 134 are mounted on the outside periphery of the motor.

The high voltage brushes 135 and the low voltage brushes 140 are mounted in insulated housings on the magnetic shaft 136.

FIG. 9B illustrates the armature laminations, and the location of both high and low voltage windings 138 and 141 within the same slots of the armature 145.

FIG. 10A is a schematic diagram showing that three separate signals are necessary in order to transmit synchro positional signals. In FIG. 10A, a signal source 150 is connected to a synchro 151 and three independent output voltages $e_1$, $e_2$, and $e_3$, are shown.

FIG. 10B shows a cross-sectional view of a four-wire cable connecting the gopher to the above ground power source. The two horizontal lines are capacitively balanced to the two vertical lines. Three separate signals $e_1$, $e_2$ and $e_3$ are shown.

FIG. 10C is another representation of the four-wire cable and shows how four lines are used to convey three independent signal voltages.

FIG. 11 lists the method whereby 27 separate independent signal states may be transmitted by choice of a combination of positive, negative and zero voltages on the four wires of FIG. 10B. For example, when a negative voltage is sent on $e_1$, a negative voltage on $e_2$ and a negative voltage on $e_3$, a "state number one" is said to be transmitted. If $e_1$ and $e_2$ are made negative while $e_3$ is at zero potential then "state two" is said to be transmitted. If $e_1$ and $e_2$ are both negative while $e_3$ is positive, "state three" is transmitted. Thus, three separate bi-polar relays can interpret 27 separate signals, states or commands to the gopher over four wires. (State number four is not a valid command state because it corresponds to that single state, in which drive power is applied to the motor, hence, there are 26 usable command states.)

FIG. 12 is a schematic drawing of the control circuitry used to transmit the command signals mentioned when we described FIG. 6. In that simplified explanation, no detailed discussion was given of the number of wires necessary to transmit the command signals to the gopher. FIG. 12 illustrates the control circuitry and the methods whereby only four separate lines can be used to transmit all necessary command signals to the gopher for testing, command, and power activation over the four wire cable shown in FIG. 10B. An A.C. signal source 150 is connected to an above ground synchro. The output of this synchro 150 is sent to a synchro within the gopher 153 via direct current decoupling capacitors 152. The output of the drill head synchro 153 is connected to a servo amplifier 154, which drives one field coil of the two phase control motor 155. The other field coil 156 is connected via a separate servo amplifier 158 via a line dropping resistor 157 from the signal reference point 150. The servo motor 155, mechanically connected by gears 159 to the shaft of the synchro 153, causes said shaft to rotate in such a manner as to cause the synchro 153 to assume the same angular position as the above ground synchro 151. This provides a shaft position memory device in the gopher so that the synchro signal transmission from above ground may be time shared. For example, pitch angle is first sent and stored. Next the azimuthal angle is transmitted. The channel selector relay contacts 160 are driven from a bank of three bi-polar relays, 161. These bi-polar relays detect the 27 command states described in FIG. 11. Simultaneous D.C. and A.C. transmission is used on the four power lines feeding the gopher. The D.C. voltages are used to actuate the bi-polar relays to select one of the 27 states or channels. The relay contacts of the bi-polar relays control the gang channel switch 160. The individual sections of the gang channel switches are labeled 160a, 160b and 160c, etc. Inductances 163, resistors 164 and capacitors 165 serve to remove A.C. control signals from accidentally operating the bi-polar relays 161. Zener diodes 166 limit the voltage applied to the bi-polar relays when the motor is energized and during switching transient. Therefore, the same cable is used for four separate purposes. First, to transmit power; second, when not transmitting power to transmit control "states" or channels by selection D.C. signals; third, to transmit A.C. synchro command signals, fourth, to transmit from the gopher telemetering data, such as the amount of wire that has spooled out.

The tendency for the gopher to rotate as a reaction to the torque developed by the drill may be removed by means of suitably shaped fins projecting from the gopher. These fins pressing against the earth would remove the tendency for the gopher to rotate counter to the drill head. Said fins can be controlled remotely to assume the desired degree of torque balance. Other means for balancing out this torque would include counter-rotating elements in the drill head akin to methods used in counter-rotating airplane propeller blades.

Although the invention has been described with reference to particular embodiments, it will be understood to those skilled in the art that the invention is capable of a variety of alternative embodiments within the spirit and scope of the appended claims.

What is claimed is:

1. In a device for subterranean laying of cable a drill head, means for powering said drill head, motor means for changing the azimuthal and vertical heading of said drill, means for storing cable to be laid, means for extruding said cable, means for compaction of the disturbed earth about said extruded cable, all of said means being located in casings arranged in train like succession behind said drill head and adapted to follow said drill head through devious borings made by said drill head through the earth, means located above ground for receiving knowledge of the location and the direction of progress of said drill and transmitting directional signals to said drill, and means located within one of said casings for surfacing said drill and casings in the event of power failure.

2. In a device for subterranean laying of cable a drill head, a series of tubular casings secured to said drill head and adapted to follow said drill head through the subterranean boring made by said drill head, a motor located in one of said casings for operating said drill head, means for directional control of said drill head, a battery also located in one of said casings, means within said motor for generating charge for said battery whereby said motor may be driven by said battery in the event of power failure for said motor, and means for directing said drill upwardly to surface in the event of such power failure.

3. A boring and drilling device for subterranean drilling and boring, wherein intelligent behavior is exhibited, said device comprising a drill head, an assembly of units following said drill head, a connecting joint universal in character, connecting the several units together in a train, the units of said train comprising means for housing a motor for powering said drill, means for controlling the angle of advance of said drill stored cable for connection to an above ground source of power, means for extruding said cable as said drill advances, and compaction means for compacting the earth around said cable.

4. A boring and drilling device for subterranean laying of cable, comprising a plurality of casings positioned in train like sequence, a drill head located on the foremost of said casings, means for operating said drill head and means for controlling from above ground the angularity of said drill head, a rear casing and a forwardly adjacent casing having telescoping relationship, storing means located in said forwardly adjacent casing for storing a cable to be laid, means for extruding said cable from said last casing as the drilling device makes its subterranean progress through the earth, and means located on said last casing for compacting the disturbed earth about said extruded cable.

5. A cable laying device for subterranean laying of cable, said device comprising a drill head for making a subterranean bore, means for operating said drill head for forward motion of said drill head, means for controlling the angular position of said drill head, means for storing cable to be laid and means for rearward extrusion of said cable, housing means for housing each of said above noted means, said housing means comprising a series of casings arranged to travel in train like succession behind said drill head, some of said casings being secured to an adjacent casing by a universal joint, a last casing and a forwardly adjacent casing, said last casing and said forwardly adjacent casing being secured together in a telescoping relationship, means for storing cable in said forwardly adjacent casing, means for extruding said cable to the rear of said train as said drill head and said casings move through the earth, and means for compacting the disturbed earth about said extruded cable.

6. In a drilling and boring device for subterranean laying of cable, a drill head, a series of casings arranged in train like sequence to follow said drill head, universal joints between some of said casings, storing means for storing said cable to be laid, extruding means, for extruding said cable from said storing means and to the rear of said train, and compaction means for compaction of disturbed earth about said cable.

7. A drilling and boring device according to claim 6 wherein said compaction means comprises a rearward casing and a forwardly adjacent casing, having telescoping relationship, said storing means located in said forwardly adjacent casing.

8. In a subterranean boring and drilling device for the subterranean laying of cable wherein flexibly joined casings follow a deviously directioned drill head through a subterranean bore made by said drill head, and wherein said cable is extruded from a rear casing, a compaction device for compacting the disturbed earth about said cable, said compaction device comprising a casing located forwardly of said rear casing, adjacent thereto and provided with telescoping relationship therewith, and providing also a cable supply cartridge, said cable being extruded through a central opening in the rear wall of said casing, leaves freely pivoted to the rear wall of said rear casing, and radially about said central opening and projecting beyond the circumference thereof, means for providing reciprocating motion of said rear casing with respect to said cable cartridge whereby said leaves compact the disturbed earth about said cable.

9. In a drilling device for making substantially horizontally directed subterranean borings, a drill head, universally joined casings secured to said drill head in train like fashion for housing drill head operating devices, means for operating said drill head for subterranean drilling, said means comprising a motor/generator housed in one of said casings, motor means operating for directional control of said drill head in azimuthal and vertical planes, a three axis sensor for sensing drill direction, an above ground control center for operating said motor/generator, for receiving information from said sensor and for giving commands to said motor means for changing drill direction, a battery located in one of said casings, battery charging means on said motor/generator for charging said battery, said motor/generator being capable of receiving energy from said battery and powering said drill head in the event of power failure from above ground.

10. In a drilling device for substantially horizontal underground drilling operations and for cable laying, a drill head, casings attached to said drill head adapted to follow said drill head in train like succession, a rear casing and an adjacent casing having telescoping relationship to each other, means within said adjacent casing for storing cable to be laid, one way means for extruding said cable from said adjacent casing, one way means for extruding said cable from said rear casing, and compaction means for compaction of the disturbed earth about said extruded cable.

11. In a cable laying device, for subterranean laying of cable, a compaction mechanism for compacting the disturbed earth about the cable after it is laid, said mechanism comprising, a rear casing and an adjacent casing capable of telescoping movement with respect to each other, storing means for storing cable in said adjacent casing, a rear wall on said rear casing, one way extruding means for extruding said cable through an opening on said wall and centrally located therein, compaction leaves freely pivoted exteriorly on said rear wall and radially located with respect to said central opening, means for alternately folding said leaves toward each other and about said central opening to cause compaction of disturbed earth about said central opening and about the cable being extruded therethrough, and alternately pivoting said leaves backward to unfolded position, said means comprising the telescoping and reciprocating movement of said rear casing and said adjacent casing with respect to each other, and means for causing such telescoping and reciprocating movement.

12. In a device for subterreanean drilling and boring, a first casing, a directable structure flexibly mounted on said casing, a drill head, a drive shaft rotatably mounted in said directable structure and secured to said drill head, a flexible segment in said drive shaft, motor means located in said casing for operating said drive shaft, means located above ground for powering said motor, means also located in said casing for moving said directable structure to change the directional heading of said drill, a second casing joined to said first casing to follow said first casing, sensing means located in said second casing for receiving directional signals from said drill head, and transmitting them to an above ground control center, control means located above ground for receiving said directional signals and for transmitting commands to said directable structure for changing the heading of said drill, means located within said first casing for powering said drill in the event of above ground power failure, and means for directing said directable structure upwardly to surface said drill in the event of such failure.

13. In a device for laying underground cable, a drill head for making generally horizontally directed subterranean drillings, universally joined housings secured to said drill head in train like sequence to follow said drill head through a subterranean boring made thereby and to house devices for controlling the operation of said drill head, a motor/generator, housed in one of said casings, said motor/generator operating normally as a motor powered from above ground for operating said drill, means for providing azimuthal and vertical direction to said drill head, means within said motor for continuously charging a battery and means also within said motor for receiving power from said battery to operate said drill head in the event of above ground power failure, and means for directing the drill head in an upward direction for retrieval of said device at ground level when said motor/generator is powered from said battery.

14. A boring and drilling device for subterranean drilling and boring wherein intelligent behavior is exhibited, said device comprising drill head means, a train of units connected to and adapted to follow said drill head through subterranean tunnels cut by said drill head, said train of units comprising, power means for powering said drill, means for controlling the angle of said drill, means for storing power cable, said cable communicating with an above ground power source, means for extruding said power cable from said assembly train as said train travels in said subterranean tunnel and means for compacting the earth so disturbed about said extruded cable.

15. A boring and drilling device for laying of cables along circuitous subterranean paths wherein hard geological materials are avoided, said device comprising, drill head means, an assembly, train like in character attached to said drill head and following said drill through such subterranean tunnels as said drill head may accomplish, said assembly comprising spool carried cable for providing power to said drill, and means for extruding said cable from said assembly as said drill head advances, means for compacting to the rear of said assembly the earth disturbed by said device.

16. A boring and drilling device for laying of cables along circuitous subterranean paths wherein hard geological materials are avoided, said device comprising, drill head means, an assembly train like in character attached to said drill head and following said drill through such subterranean tunnels as said drill head may accomplish, said assembly comprising spool carried cable for providing power to said drill, means for extruding said cable from said assembly as said drill head advances, means for compacting to the rear of said assembly the earth disturbed by said device, and means for recovery of said drill head and its attached assembly, said means comprising means for reorienting said drill head to progress upwardly to ground level in case of power failure, and an emergency power source, located within said train to provide emergency power for said drill head.

17. In a device for subterranean laying of cable, a drill head, a plurality of casings attached to and adapted to follow said drill head in train like succession through subterranean borings made by said drill head, motor means for operating said drill head located within one of said casings, sensing means for providing drill head directional information, motor means for changing the directional heading of said drill head in response to said information, means for storing cable, means for extruding said cable rearwardly of said casings, compaction means for compaction of the disturbed earth about said extruded cable, said compaction means providing also forward impetus to said drill head.

References Cited

UNITED STATES PATENTS 1,388,545   8/1921   Bohan _____ 299—30

FOREIGN PATENTS 735,749   8/1955   Great Britain.

ERNEST R. PURSER, *Primary Examiner.*

N. C. BYERS, *Assistant Examiner.*